United States Patent [19]

Kassatly

[11] Patent Number: 4,903,126
[45] Date of Patent: Feb. 20, 1990

[54] METHOD AND APPARATUS FOR TV BROADCASTING

[76] Inventor: Salim A. Kassatly, 18600 NE. August Ave., Battle Ground, Wash. 98604

[21] Appl. No.: 308,826

[22] Filed: Feb. 10, 1989

[51] Int. Cl.$^4$ .............................................. H04N 7/04
[52] U.S. Cl. .................................... 358/146; 358/142; 358/181; 370/69.1; 370/112
[58] Field of Search ................. 358/142, 146, 181, 86; 370/69.1, 73, 109, 112, 118, 124

[56] References Cited

U.S. PATENT DOCUMENTS

| | | | |
|---|---|---|---|
| 4,215,369 | 7/1980 | Iijima .................................... | 358/146 |
| 4,300,161 | 11/1981 | Haskell ................................. | 370/109 |
| 4,410,980 | 10/1983 | Takasaki et al. ..................... | 370/109 |
| 4,533,936 | 8/1985 | Tiemann et al. ...................... | 358/12 |
| 4,593,318 | 6/1986 | Eng et al. ............................. | 358/146 |
| 4,646,135 | 2/1987 | Eichelberger et al. .............. | 358/146 |

Primary Examiner—John W. Shepperd
Assistant Examiner—Michael D. Parker
Attorney, Agent, or Firm—S. A. Kassatly

[57] ABSTRACT

A television broadcasting method and apparatus. The broadcasting method generally includes the steps of multiplexing signals from a plurality of channels over a single carrier frequency, and transmitting the multiplexed signals to a reception circuit. The multiplexed signals are then demultiplexed at the reception circuit. The demultiplexed signals are then separated into separate channels, and then stored for a predetermined period of time. The signals of the selected channel are then decompressed and reconstructed on a real-time basis and are then displayed or viewed also on a real-time basis.

5 Claims, 4 Drawing Sheets

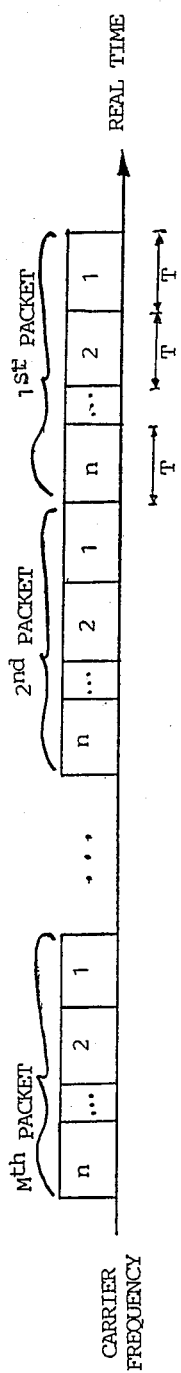
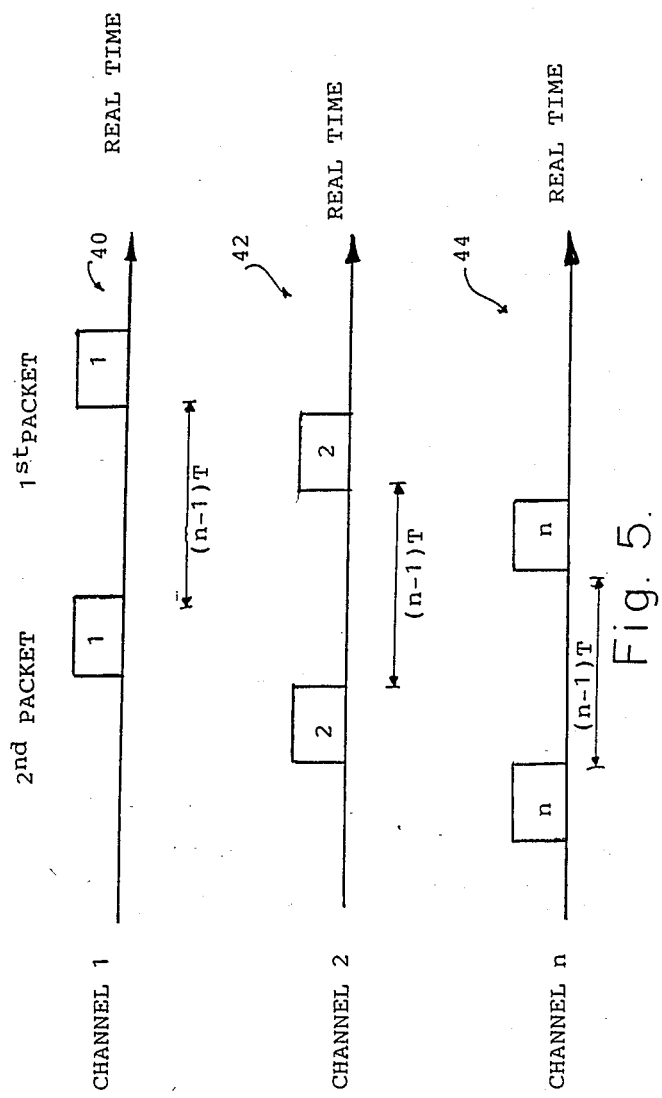

METHOD AND APPARATUS FOR TV BROADCASTING

BACKGROUND OF THE INVENTION

1. Technical Field

The present invention relates in general to telecommunications systems such as television and TV cable broadcasting. It more particularly relates to a method and apparatus for an efficient broadcasting.

2. Background Information.

Conventional Television and TV cable broadcasting is carried out on a real-time basis. For instance, it takes the same length of time to broadcast or transmit a TV program than it does to receive and display the program. Such broadcasting method has proven to be less than completely desirable due to the limited number of available TV channels.

Channel availability has been a crucial limitation in the broadcasting industry. Channel allocation has been very valuable and expensive. It has precluded several interested persons, small businesses, consumers and local community chapters from accessing the TV broadcasting networks.

TV broadcasting has become the single most important and popular means for accessing and educating large numbers of citizens. Therefore, TV broadcasting has a direct effect on the right to free speech and expression as guaranteed by the First Amendment of the United States of America.

Wherefore, it would be highly desirable to have a new and improved method and apparatus for increasing channel availability and for rendering the channel allocation process more efficient. The new method and apparatus should be relatively simple and inexpensive to implement and to place into effect. The new method and apparatus should also be capable of being implemented with new as well as existing television sets.

SUMMARY OF THE INVENTION

Therefore, it is an object of the present invention to address the concerns associated with conventional broadcasting, and to provide adequate solutions thereto.

Briefly, the above and further objects and features of the present invention are realized by providing a new and improved television broadcasting method and apparatus. The broadcasting method generally includes the steps of multiplexing signals from a plurality of channels over a single carrier frequency, and transmitting the multiplexed signals to a reception circuit.

The multiplexed signals are then demultiplexed at the reception circuit. The demultiplexed signals are then separated into separate channels, and then stored for a predetermined period of time. The signals of the selected channel are then decompressed and reconstructed on a real-time basis and are then displayed or viewed also on a real-time basis.

THEREFORE, the new and improved method and apparatus for broadcasting increases channel availability and renders the channel allocation process more efficient. The new method and apparatus are relatively simple and inexpensive to implement. The new method and apparatus can be implemented with new as well as existing television sets. Additionally, the new apparatus can be used to prevent copying and taping of generally copyrighted programs.

BRIEF DESCRIPTION OF THE DRAWINGS

The above and other objects and features of the present invention and the manner of attaining them, will become apparent, and the invention itself will be best understood, by reference to the following description of the embodiments of the invention, taken in conjunction with the accompanying drawing, wherein:

FIG. 4 is diagrammatic representation of the real-time signal processing at the output of a transmitter circuit which forms a part of the apparatus of FIG. 3; and FIG. 5 is a diagrammatic representation of the real-time signal processing at the input of a receiver circuit which forms a part of the apparatus of FIG. 3.

DESCRIPTION OF THE PREFERRED EMBODIMENT

Figure 1:
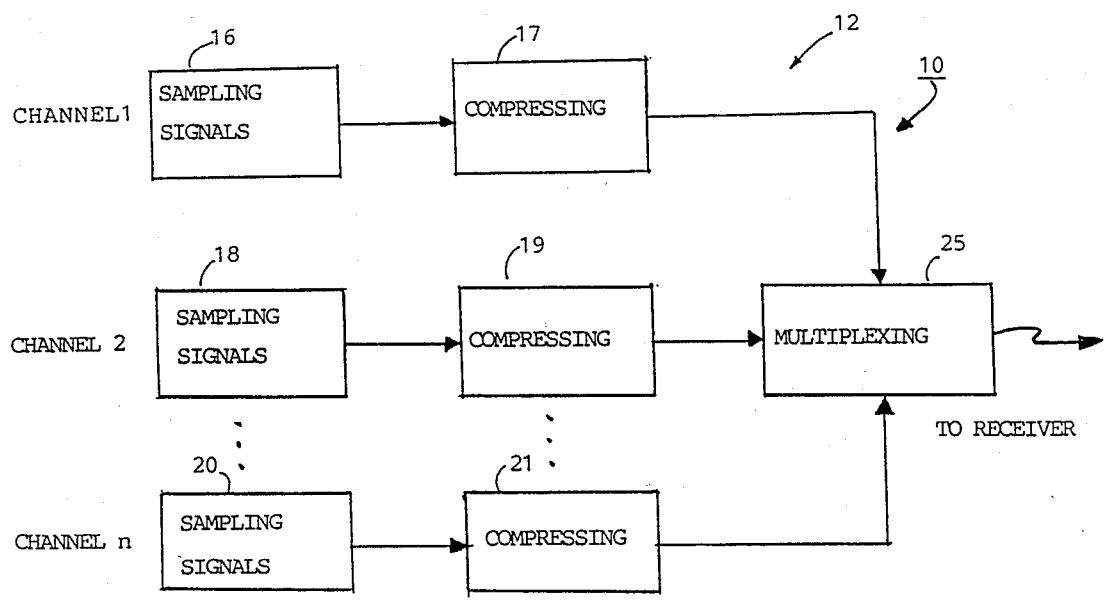
FIG. 1 is a flow chart of a method for broadcasting and receiving TV signals according to the present invention.
Figure 1:
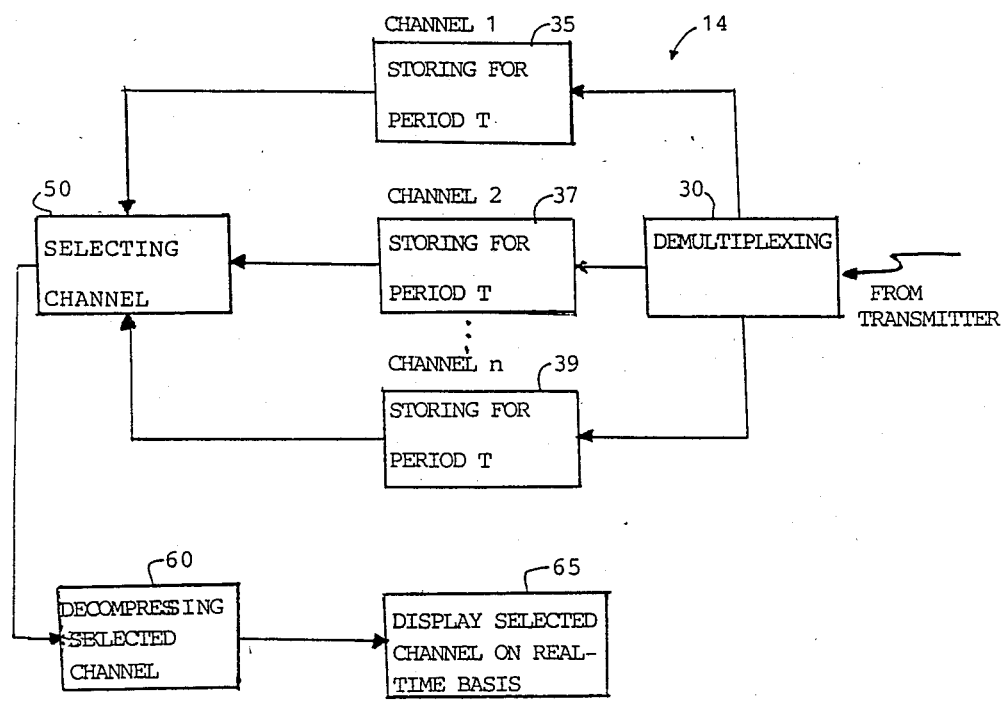

Referring now to the drawings, and more particularly to FIG. 1 thereof, there is illustrated a flow chart of a method 10 for broadcasting and receiving TV signals according to the present invention. The method 10 generally comprises a process 12 for processing signals to be transmitted, and a process 14 for processing received signals.

The transmission process 12 generally includes multiplexing signals from a plurality of channels 1, 2, through n, prior to transmission. The multiplexed signals are then transmitted on a single base frequency.

The reception process 14 generally includes demultiplexing the transmitted signals, storing the received signals for a predetermined period of time T, and then displaying only the selected channel.

Considering now the transmission process 12 in greater in detail, with respect to FIGS. 1 and 4, it includes independently sampling signals of a first channel 1 as indicated at 16, for a predetermined period of time T. The sampled signals are then compressed at 17.

The signals on each one of the remaining channels 2 through n are processed similarly to channel 1, as indicated at 18, 19, 20 and 21. The multiplexing of the signals from all the channels 1, 2 through n are then multiplexed at 25. FIG. 4 illustrates the real-time multiplexing of the signals from all the channels. Thus, the signals are multiplexed in the form of successive packets.

Returning now to FIG. 1, the reception process 14 includes receiving the multiplexed signals and then demultiplexing the same at 30 into the same number of independent channels 1 through n. The signals are then independently stored as indicated at 35, 37 and 39 in FIG. 1, and at 40, 42 and 44 in FIG. 5.

Once a particular channel, such as channel 2 is selected at 50 (FIG. 1) only the signals of that particular channel are displayed on a real-time basis. However, since the last compressed signals in a packet, such as the first packet, for each channel, such as channel 2, are separated from the beginning of the compressed signals in the next packet, by $(n-1)T$, it is important to serially display the information contained in successive packets to avoid a non-continuous display of signals.

For this purpose, a processor or computer (not shown) at the receiving end it decompresses the signals of the selected channel at 60, and reconstructs the initial real-time signals. Simultaneously, the processor expands the real-time spread of the restored signals over a period of T, thus bridging the (n−1)T time between two successive packets. The restored signals are then displayed at 65.

At present, the main limitation to the period T is the limitation on the storage memory. However it should be understood that with the increased availability of expanded memory capacity the period T can be increased in length.

Figure 2:
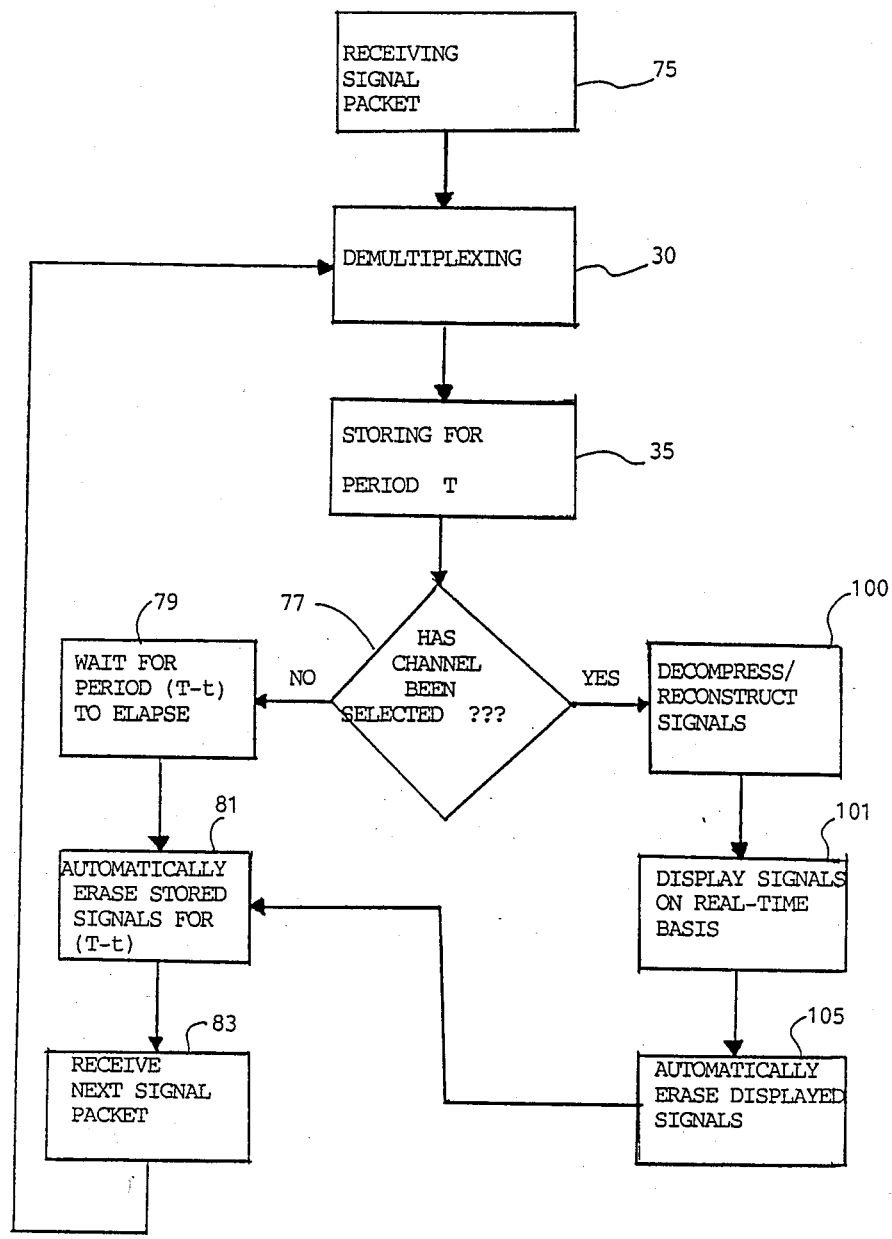
FIG. 2 is a flow chart further detailing the reception process of the signals for each individual channel.

Considering now FIG. 2 in greater detail, it generally illustrates a flow chart further detailing the reception process of the signals for each individual channel such as channel 1. Such process can be carried out by a software program at the receiving end or TV set.

The compressed signals are first received at 75, at the input of a demultiplexer 105 (FIG. 3) in the form of a packet of signals from various channels. The received signals are then demultiplexed at 30, and the demultiplexed signals are then stored for a predetermined period of time T, and for each channel separately from the others, as indicated at 35, 37 and 39 in FIG. 1.

The software then determines at 77 whether that particular channel has been selected. If it has not been selected, then the software waits at 79 for a period (T−t) to elapse; where "t" is defined as a relatively small incremental period compared to the period T.

At the end of the time period (T−t), the software automatically erases the signals stored of the elapsed period (T−t), at 81. The time period t allows the signals from the next packet to replace the erased signals which are received by the demultiplexer 105. Thus, it can be seen that the period t is substantially smaller than T, and that for certain applications, the period t can be so negligible that it can be ignored totally.

The signals from the next packet are then received at 83, and the cycle of multiplexing and storing the signals is then repeated.

If the software determines that the particular channel has been selected by the user or TV viewer, then the stored signals for that particular channel are decompressed and restored at 100, in the manner described above.

The reconstructed signals are then displayed on a real-time basis at 101. Thus, instead of using real-time transmission of the signals, the signals can now be transmitted in a compressed form, thereby saving clearing precious channel space and increasing channel availability, and the real-time signal reconstruction is carried out at the user's level without excessive cost.

The signals which have been displayed are automatically erased from the storage memory at 105. Once the signals are reconstructed at 100 the previously stored compressed signals are automatically erased at 81, and the cycle of multiplexing and storing the signals is then repeated.

Figure 3:
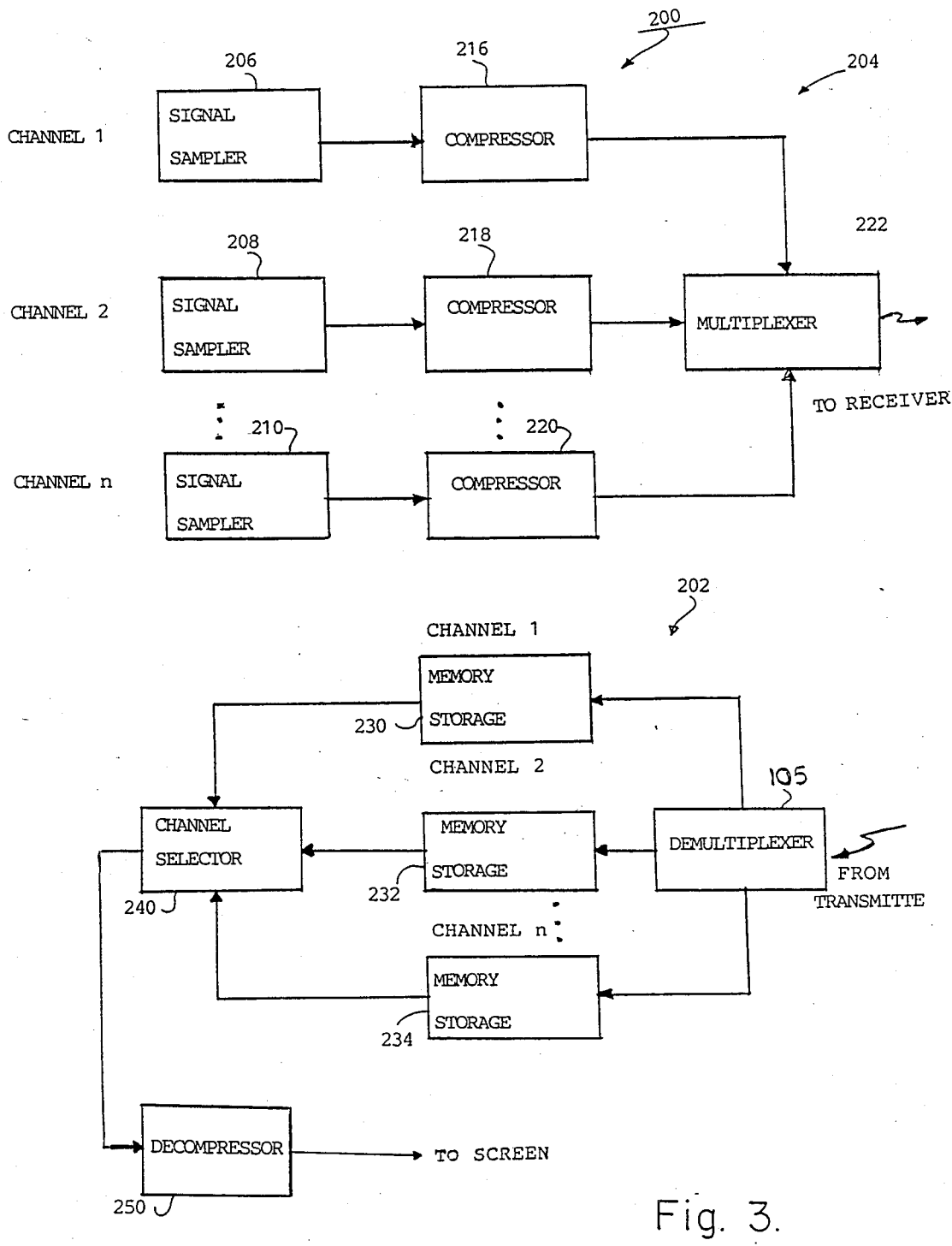
FIG. 3 is a block diagram of a TV broadcasting and reception apparatus which is constructed in accordance with the present invention.

Referring now to FIG. 3, there is illustrated a block diagram of a TV broadcasting and reception apparatus 200 which is constructed in accordance with the present invention and which performs the steps of the process 10, as illustrated in FIGS. 1 and 2.

In operation, the user simply connects the reception circuit 202 of the apparatus 200 between his or her antenna or cable outlet and the conventional TV set, and operates his or her TV set as usual.

The apparatus 200 also serves another important function, namely to prevent copying or taping of the TV programs. This is accomplished by incorporating the reception circuit 202 inside the TV set, invisibly from the user, thereby preventing access to the reconstructed signals.

The apparatus 200 generally includes a transmission circuit 204 and the reception circuit 202. While the components used in the apparatus 200 are conventional parts, generally known and available in the electronics industry, it should be understood that the combination of these components to produce the novel results, features and advantages is new.

The transmission circuit 204 generally includes a signal sampler 206, 208 and 210 for each one of the channels 1 through n respectively. It further includes a separate compression circuit 216, 218 and 220 for each one of the channels 1 through n. The compressed signals are then fed to a multiplexer 222, and are transmitted to the reception circuit 202.

The reception circuit 202 generally includes a demultiplexer 105 which separates the incoming signals into their respective separate channels. The demultiplexed signals are then stored in a separate memory storage 230, 232 or 234, for each one of the channels 1 through n.

A conventional channel selector 240 enables the user to select the channel he or she wishes to view. A decompressor 250 decompresses and reconstructs only those signals on the selected channel, which signals are then displayed on a screen or monitor (not shown).

While a particular embodiment of the present invention has been disclosed, it is to be understood that various different modifications are possible and are contemplated within the true spirit and scope of the specification, drawings and appended claims. There is no intention therefore, of limitations to the exact abstract or disclosure herein presented.

What is claimed is:

1. A television broadcasting method comprising the steps of:
    (a) compressing and multiplexing signals from a plurality of channels over a single carrier frequency;
    (b) transmitting the multiplexed signals;
    (c) receiving the multiplexed signals;
    (d) demultiplexing and separating the received signals into separate channels;
    (e) storing the separated signals for a predetermined period of time;
    (f) selecting a desired channel;
    (g) decompressing and reconstructing the signals of the selected channel on a real-time basis; and
    (h) displaying the reconstructed signals of the selected channel on a real-time basis.

2. The method as defined in claim 1, further including the steps of:
    (a) determining whether a particular channel has been selected; and
    (b) if the particular channel has not been selected, then automatically erasing the stored signals for that particular channel.

3. The method as defined in claim 1, wherein said transmitting step includes transmitting the compressed signals from the channels in a packet form.

4. The method as defined in claim 2, further including the steps of:

(a) if the particular channel has been selected, then decompressing the signals of that particular channel;
(b) reconstructing the originally transmitted signals from the decompressed signals;
(c) displaying the reconstructed signals on a real-time basis; and
(d) automatically erasing the compressed signals of that channel in preparation for storage of the next demultiplexed signals.

5. A television broadcasting apparatus comprising:

(a) means for compressing and multiplexing signals from a plurality of channels over a single carrier frequency;
(b) means for transmitting the multiplexed signals;
(c) means for receiving the multiplexed signals;
(d) means for demultiplexing and separating the received signals into separate channels;
(e) means for storing the separated signals for a predetermined period of time;
(f) means for selecting a desired channel;
(g) means for decompressing and reconstructing the signals of the selected channel on a real-time basis; and
(h) means for displaying the reconstructed signals of the selected channel on a real-time basis.

* * * * *